United States Patent [19]

Hammond, Jr. et al.

[11] Patent Number: 5,162,491

[45] Date of Patent: Nov. 10, 1992

[54] COPOLYADIPAMIDE CONTAINING TRIMETHYLHEXAMETHYLENEADIPAMIDE UNITS

[75] Inventors: James A. Hammond, Jr., Chattanooga, Tenn.; David N. Marks, Wilmington, Del.

[73] Assignee: E. I. Du Pont de Nemours and Company, Wilmington, Del.

[21] Appl. No.: 718,941

[22] Filed: Jun. 21, 1991

[51] Int. Cl.⁵ .............................................. C08G 69/26
[52] U.S. Cl. ................................... 528/349; 528/335; 528/340
[58] Field of Search .................... 528/349, 340, 335

[56] References Cited

U.S. PATENT DOCUMENTS

| | | | |
|---|---|---|---|
| 2,752,328 | 6/1956 | Magat | 260/78 |
| 3,418,199 | 12/1968 | Anton et al. | 161/175 |
| 3,557,544 | 6/1971 | Simons | 57/140 |
| 3,583,949 | 6/1971 | Simons | 260/78 |
| 3,728,312 | 4/1973 | Schneider et al. | 260/78 R |
| 3,790,531 | 2/1974 | Christoph et al. | 260/78 R |
| 3,872,055 | 3/1975 | Furukawa et al. | 260/45.7 P |
| 4,250,291 | 2/1981 | Gude et al. | 528/340 |
| 4,559,196 | 12/1985 | Kobsa et al. | 264/168 |
| 4,566,931 | 1/1986 | Panoch et al. | 156/330.9 |
| 4,925,914 | 5/1990 | Dolden et al. | 528/336 |

FOREIGN PATENT DOCUMENTS

| | | |
|---|---|---|
| 59-43057 | 9/1984 | Japan . |
| 1-104652 | 4/1989 | Japan . |
| 1-104653 | 4/1989 | Japan . |
| 1-104654 | 4/1989 | Japan . |
| 1225621 | 3/1971 | United Kingdom . |
| 1554245 | 10/1979 | United Kingdom . |

*Primary Examiner*—Harold D. Anderson

[57] ABSTRACT

A copolyadiapamide consisting essentially of between about 60 and about 99.5 mole percent hexamethyleneadipamide units and between about 0.5 and 40 mole percent trimethylhexamethyleneadipamide units, the copolyamide having an RV greater than about 25, and a melting point of greater than about 220° C.

8 Claims, No Drawings

COPOLYADIPAMIDE CONTAINING TRIMETHYLHEXAMETHYLENEADIPAMIDE UNITS

BACKGROUND OF THE INVENTION

The present invention relates to polymers and more particularly to a copolyadipamide having hexamethyleneadipamide units and a minor portion of trimethylhexamethyleneadipamide units, and products prepared therefrom.

Polyadipamide polymers, e.g., polyhexamethyleneadipamide (nylon 66), have a number of positive characteristics, but are quite thermally unstable at their normal processing temperatures. When kept in the molten state at processing temperature for a long time, polyadipamides form branched/crosslinked, insoluble, nonfusible gel. The formation of gel in the polymer product and on the walls of processing equipment results in deficient product with poor processibility, particularly when fiber spinning is involved. The fiber spinning breaks which may occur are troublesome and make the winding of large yarn packages impractical.

Certain remedies to gel-formation have been reported such as in U.S. Pat. No. 3,872,055. U.S. Pat. No. 3,872,055 discloses a polyamide composition which has a decreased gel-forming property, specifically a copolyamide of the diamine-dicarboxylic acid type containing a phosphinic or phosphonous acid compound together with an alkali metal compound.

SUMMARY OF THE INVENTION

In accordance with the invention, there is provided a copolyadipamide consisting essentially of between about 60 and about 99.5 mole percent hexamethyleneadipamide units and between about 0.5 and 40 mole percent trimethylhexamethyleneadipamide units, the copolyamide having an RV greater than about 25, and a melting point of greater than about 220° C. For convenience, the copolyamide of the invention will be referred to as nylon 66/trimethyl66.

In a preferred form of the invention, the copolyadipamide consists essentially of between about 90 and about 99.5 mole percent hexamethyleneadipamide units and between about 0.5 and 10 mole percent trimethylhexamethyleneadipamide units. Preferably, the RV of the copolyamide is between about 30 and about 80, most preferably between about 30 and about 60.

The copolyamide of the invention provides a reduced gel formation rate relative to that of nylon 66 and provides improvements in product quality, increases in process continuity, and decreases in equipment maintenance costs.

DETAILED DESCRIPTION

The copolyadipamides of the invention are substantially linear copolyamides which consist essentially of between about 60 and about 99.5 mole percent hexamethyleneadipamide units and between about 0.5 and 40 mole percent trimethylhexamethyleneadipamide (trimethyl66) units. Preferably, the trimethyl66 units are selected from the class consisting of 2,2,4-trimethylhexamethyleneadipamide units, 2,4,4-trimethylhexamethyleneadipamide units, and mixtures thereof. In the preferred copolyadipamides, the trimethyl66 units are generally randomly distributed throughout the copolymer. The copolyamide has properties similar to homopolymer nylon 66, but has significant advantages in product quality, production cost, and processability.

Depending on the intended end use of the copolyadipamides of the invention, it is advantageous to employ varying mole percentages of trimethyl66 in the copolyamide. So that the properties of copolyamide remain similar to the properties of homopolymer poly(hexamethyleneadipamide), it is preferable for the mole percentage of trimethyl66 in the polymer to be between about 0.5 and about 10%.

The copolyadipamides in accordance with the invention have a formic acid relative viscosity (RV) of greater than about 25. Preferably, the RV of the copolyadipamide is between about 30 and about 80, most preferably, between about 30 and about 60.

The melting point of the copolyadipamides in accordance with the invention is greater than about 220° C. The melting points of the copolyadipamides vary with the percentage of trimethyl66 and thus range very close to the melting point of homopolymer nylon 66 polymer, about 265° C., when the percentage of trimethyl66 is about 0.5%. With increasing trimethyl66, the melting point decreases to about 220° C where the trimethyl66 percentage is about 40%.

Surprisingly, the copolyadipamides of the invention have been found to form "gel" at a substantially lower rate than nylon 66 homopolymer. "Gel" refers to the very high molecular weight, branched/crosslinked polymer which forms in the nylon 66 polymer melt and which collects in the product and on equipment walls in contact with the molten polymer. The gel is essentially insoluble and often can only be removed from equipment using extreme measures such as by burning off of the gel. As shown in Table I(c), the gelation time (the time required to show an inflection in a melt viscosity vs. heating time plot of a polymer sample maintained at a constant temperature and constant steam pressure) increases significantly with increasing percentages of trimethyl66. In addition, since the melting point of the copolyamide is lower, and is substantially lower at the greater trimethyl66 mole percentages, the gelation time can be further increased without affecting spinning performance by employing lower polymer melt temperatures.

The copolyadipamides of the invention can be prepared by condensation polymerization in an aqueous "salt" solution formed by mixing adipic acid with hexamethylenediamine (HMD) and trimethylhexamethylenediamine (TMHMD) in the molar proportions necessary to produce the copolymer with the desired mole percent of trimethyl66 units. Adapted as necessary to compensate for the different properties of the TMHMD, procedures useful for the production of homopolymer poly(hexamethyleneadipamide) can be applied to the production of the copolymer of the invention.

A particularly convenient method for making a copolyadipamide in accordance with the invention is to provide two aqueous salt solutions of hexamethylene diammonium adipate and trimethylhexamethylene diammonium adipate. Necessary quantities of the two solutions can be readily mixed to produce a salt solution for the desired copolyamide.

It is sometimes desirable to add a catalyst to the salt solution. A variety of catalysts are known for use in polymerizing homopolymer nylon 66 such as phenyl phosphinic acid, manganese hypophosphite, etc. The salt solution with or without catalyst is reacted in a suitable reaction vessel such as an autoclave under an inert atmosphere. One preferred procedure is purging the autoclave with nitrogen and increasing the pressure to about 265 psia. The salt solution is heated to a temperature of about 250° C. The pressure is then released over, for example, one hour while increasing the temperature to about 275° C. The reaction temperature is held constant at atmospheric pressure for sufficient time to complete the reaction to the extent desired. The copolyamide can be cooled in the autoclave and ground or can be extruded from the autoclave into water and conveniently chipped and dried to produce flake. The RV of the polymer from the clave can be in the range of 25-80 but is typically in the range of 25-45.

The copolyamide in accordance with the invention can also be made by any of a variety of continuous polymerization processes.

The copolyadipamide is useful in a wide variety of known processes for the manufacture of fibers, films and molded articles. For use of the composition in fibers, any of a variety of known additives such as delustrants, e.g., titanium dioxide, antioxidants, pigments, and other materials may be added to the copolyamide at a suitable point in the polymer preparation or, for example, as the flake is melted in an extruder in advance of spinning.

The following example is offered for the purposes of illustrating the invention and is not intended to be limiting. Percentages are by weight except for mole percentages of 66 and trimethyl66 monomer units. The test methods which follow were used for obtaining the results reported.

TEST METHODS

The formic acid relative viscosity (RV) of the polyamide is measured as described at col. 2, 1. 42-51, in Jennings, U.S. Pat. No. 4,702,875, which provides: The relative viscosity (RV) of polyhexamethylene adipamide is the ratio of the viscosity of the solution of 8.4 percent (by weight) polymer in a solution of 90 percent formic acid and 10 percent water (by weight) at 25° C., to viscosity of the formic acid water solution, per se, measured in the same units at 25° C.

Amine and carboxyl ends are determined by the methods described on pages 293 and 294 in Volume 17 of the "Encyclopedia of Industrial Chemical Analysis" published by John Wiley & Sons, Inc. in 1973.

The gel time (reported in hours) is the time required to show a sharp inflection and rise in polymer melt viscosity while heating a polymer sample maintained at a constant temperature and constant steam pressure. A plot of polymer melt viscosity versus time will show a rise or inflection in melt viscosity as formation of polymer gel makes the bulk polymer more viscous. Alternately, gel time can be determined by the method of U.S. Pat. No. 3,872,055. This method reports the time required for making the copolyamide insoluble (when only solvent swelling is observed) in anhydrous formic acid after being heated at a given temperature and pressure in a steam atmosphere.

EXAMPLE I

Into a 1 gallon autoclave, the following reactants were added in varied amounts as indicated in Table I(a) to provide the indicated mole % ratios: nylon 66 salt solution (approximately 50% concentration), adipic acid, and trimethylhexamethylenediamine (TMHMD) with or without water as indicated. The TMHMD used was obtained from American Tokyo Kasei, Inc., 9211 N. Harborgate St., Portland Oreg. 97203 and is a mixture of 2,2,4- and 2,4,4-trimethylhexamethylenediamines.

TABLE I(a)

| Nylon 66/ Trimethyl 66 | TMHMD(g) | Adipic Acid(g) | Nylon 66 Salt(g) | Water(g) |
|---|---|---|---|---|
| 100/0 | 0 | 0 | 2000 (51.5%) | 0 |
| 95/5 | 34.8 | 30.2 | 2000 (51.5%) | 0 |
| 85/15 | 94.4 | 86.2 | 1700 (51.5%) | 0 |
| 65/35 | 170.3 | 154.7 | 1000 (51.5%) | 150 |

For each reactant mixture, the autoclave was purged with nitrogen and sealed. The pressure release valve on the clave was set to 265 psia and the clave was heated to 250° C. When the temperature reached 250° C., the pressure reduction cycle was started so that the pressure was reduced to atmospheric over one hour. At the same time, the temperature of the autoclave was raised to 275° C. When the pressure reached atmospheric, it was held for 45 minutes. The molten polymer was removed from the autoclave under nitrogen pressure as a continuous filament and cooled in water. The polymer was subsequently ground to a fine powder and dried at 90° C. in a vacuum oven over night. Properties of the compositions prepared are reported in Table I(b). The gel times of the 66/trimethyl66 copolymers at 292° C. are given in Table I(c).

TABLE I(b)

| Nylon 66/trimethyl 66 | Relative Viscosity | End Groups (Equiv./10⁶ g) | |
|---|---|---|---|
| | | Amine | Carboxyl |
| 100/0 | 53 | 60 | 56 |
| 95/5 | 52 | 34 | 121 |
| 85/15 | 34 | 49 | 99 |
| 65/35 | 32 | 49 | 86 |

TABLE I(c)

| Nylon 66/trimethyl 66 | Gel Time, 292° C., Hr. |
|---|---|
| 100/0 | 15.0 |
| 95/5 | 18.0 |
| 85/15 | 20.0 |
| 65/35 | 31.4 |

We claim:
1. A copolyamide consisting essentially of between about 60 and about 99.5 mole percent hexamethyleneadipamide units and between about 0.5 and about 40 mole percent trimethylhexamethyleneadipamide units, said copolyamide having a relative viscosity greater than about 25, and a melting point of greater than about 220° C., said relative viscosity being measured at 25° C., in a solution of 8.4% by weight polymer in a solvent of formic acid containing 10% by weight of water.

2. The copolyadipamide of claim 1 wherein said relative viscosity is between about 30 and about 80.

3. The copolyadipamide of claim 1 wherein said relative viscosity is between about 30 and about 60.

4. The copolyadipamide of claim 1 wherein said trimethylhexamethyleneadipamide units are selected from the class consisting of 2,2,4-trimethylhexamethyleneadipamide units, 2,4,4-trimethylhexamethyleneadipamide units, and mixtures thereof.

5. A copolyamide consisting essentially of between about 90 and about 99.5 mole percent hexamethylene adipamide units and between about 0.5 and about 10 mole percent trimethylhexamethyleneadipamide units, said copolyamide having a relative viscosity greater than about 25, and a melting point of greater than about 220° C., said relative viscosity being measured at 25° C. in a solution of 8.4% by weight polymer in a solvent of formic acid containing 10% by weight of water.

6. The copolyadipamide of claim 5 wherein said relative viscosity of about 30 and about 80.

7. The copolyadipamide of claim 5 wherein said relative viscosity is between about 30 and about 60.

8. The copolyadipamide of claim 5 wherein said trimethylhexamethyleneadipamide units are selected from the class consisting of 2,2,4-trimethylhexamethyleneadipamide units, 2,4,4-trimethylhexamethyleneadipamide units, and mixtures thereof.

* * * * *